United States Statutory Invention Registration [19]

[11] Reg. Number: H784

Adolph et al. [43] Published: Jun. 5, 1990

[54] COPOLYFORMALS OF 1,2-BIS(2-HYDROXYETHYL)-1,2-DICARBADODECABORANE(12) AND POLYFLUOROALKYL DIOLS

[75] Inventors: Horst G. Adolph, Burtonsville; Lori A. Nock, Baltimore, both of Md.

[73] Assignee: The United States of America as represented by the Secretary of the Navy, Washington, D.C.

[21] Appl. No.: 389,217

[22] Filed: Aug. 2, 1989

[51] Int. Cl.[5] ..... C08G 4/00; C08G 6/00

[52] U.S. Cl. ..... 528/241; 528/244

*Primary Examiner*—John S. Maples
*Assistant Examiner*—Richard Treanor
*Attorney, Agent, or Firm*—Kenneth E. Walden; Roger D. Johnson

[57] ABSTRACT

Dihydroxy-terminated copolyformals formed from

A. formaldehyde and

B. a diol comonomer mixture of (1) 1,2-bis(2-hydroxyethyl)-1,2-dicarbadodecaborane(12) and (2) a fluorodiol which is $HOCH_2CF_2CF_2CF_2CH_2OH$, $HOCH_2CF_2CF_2CF_2CF_2CH_2OH$, $HOCH_2CF(CF_3)OCF_2CF_2CF_2CH_2OH$, $HOCH_2CF_2OCF_2CF_2OCF_2CH_2OH$, $HOCH_2CH_2(CF_2)_2CH_2CH_2OH$, $HOCH_2CH_2(CF_2)_4CH_2CH_2OH$, $HOCH_2CH_2(CF_2)_6CH_2CH_2OH$, $HOCH_2CH_2(CF_2)_8CH_2CH_2OH$, $HOCH_2CH_2(CF_2)_{10}CH_2CH_2OH$, or mixtures thereof. A fraction of the fluorodiol may be replaced with an equal number of moles of a suitable nitrodiol.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COPOLYFORMALS OF 1,2-BIS(2-HYDROXYETHYL)-1,2-DICARBADODECABORANE(12) AND POLYFLUOROALKYL DIOLS

BACKGROUND OF THE INVENTION

This invention relates to copolyformals and more particularly to copolyformals containing carborane and polyfluoroalkyl groups.

Previously, carborane based burning rate modifiers have been incorporated in propellant compositions as separate species, physically dissolved in the binder. This has permitted crystallization and migration of the burning rate modifier within the propellant composition and across interfaces with adjoining materials, resulting in nonuniform distribution of the carborane compound within the propellant composition.

U.S. Pat. No. 3,258,479 discloses the polymerization of 1,2-bis(2-hydroxyethyl)-1,2-dicarbadodecaborane(12), $B_{10}H_{10}[C(CH_2CH_2OH)]2$, with either (a) 1,2-bis(carboxymethyl)-1,2-dicarbadodecaborane(12), $B_{10}H_{10}[C(CH_2COOH)]_2$, or (b) the corresponding acid chloride, $B_{10}H_{10}[C(CH_2COCl)]_2$, to form a polyester which is useful in solid rocket propellants. U.S. Pat. No. 3,311,593 discloses the reaction of 1,2-bis(2-hydroxyethyl)-1,2-dicarbadodecaborane(12), $B_{10}H_{10}[C(CH_2CH_2OH)]_2$, with a 1,2-dicarbadodecaborane(12) diisocyanate of the formula $B_{10}H_{10}[C(N{=}C{=}O)]$hd 2 to produce a polyurethane which is useful in solid rocket propellants. Because of their physical properties, these polymers are not suitable as binders for many solid propellant applications. Moreover, the dicarborane content of these polymers is fixed and can not be tailored to a variety of applications.

It would be desirable in fluoro polymer propellant binders to tie down the carborane-based burning rate modifiers in a uniform distribution and thus achieve a more uniform burning propellant. It would also be desirable to vary the carborane content of the propellant binders in controlled amounts.

SUMMARY OF THE INVENTION

Accordingly, an object of this invention is to provide new polymeric binders for propellants.

Another object of this invention is to provide polyfluoroalkyl diol prepolymers with carborane groups bonded to the backbone of the prepolymers.

A further object of this invention is to provide propellant compositions with carborane groups which will not migrate or crystallize out.

Yet another object of this invention is to provide means for tailoring the burning rates of propellant composites by varying the carborane content and distribution in a uniform, predictable manner.

These and other objects of this invention are accomplished by providing dihydroxy-terminated copolyformal formed from A. formaldehyde and B. a diol comonomer mixture of (1) 1,2-bis(2-hydroxyethyl)-1,2-dicarbadodecaborane((12) and (2) a fluorodiol selected from the group consisting of $HOCH_2CF_2CF_2CF_2CH_2OH$, $HOCH_2CF_2CF_2CF_2CF_2CH_2OH$, $HOCH_2CF(CF_3)OCF_2CF_2CF_2CH_2OH$, $HOCH_2CF_2OCF_2OCF_{20}CF_2CH_2OH$, $HOCH_2CH_2(CF_2)_2CH_2CH_2OH$, $HOCH_2CH_2(CF_2)_4CH_2CH_2OH$, $HOCH_2CH_2(CF_2)_6CH_2CH_2OH$, $HOCH_2CH_2(CF_2)_8CH_2CH_2OH$, $HOCH_2CH_2(CF_2)_{10}CH_2CH_2OH$, or mixtures thereof.

wherein 1,2-bis(2-hydroxyethyl)-1,2-dicarbadodecaborane(12) comprises from more than zero to less than 50 mole percent of the diol comonomer mixture with the fluorodiol being the remainder, and wherein the terminal functional groups of the copolyformal are hydroxy groups.

DETAILED DESCRIPTION OF THE PREFERRED EMBODIMENT

The polymers of the present invention are prepared by the polycondensation of 1,2-bis(2-hydroxyethyl)-1,2dicarbadodecaborane(12) and a fluorodiol with formaldehyde in sulfolane with a boron trifluoride etherate catalyst. The resulting carborane and fluoro monomeric units will be distributed more or less randomly in the polymeric chain with formal (—$OCH_2O$—) linkages between monomeric units. Due to the absence of side reactions in the propagation and termination steps of the polymerization reaction, the copolyformals described here are nearly 100 percent difunctional and exclusively terminated by hydroxy groups. This characteristic is useful because it results in reproducible curing in castcurable compositions, and because it permits the synthesis of well-defined block copolymers. The carborane units are fairly uniformly distributed in selected concentrations and are bonded to the backbone of the copolyformal and thus will not migrate.

The carborane containing monomer used in the copolyformals of this invention is 1,2-bis(2-hydroxyethyl)-1,2-dicarbadodecaborane(12) which is also called 1,2-diethanol-1,2-dicarbadodecaborane(12) and which has the chemical abstracts identification number 23810-37-9. R. P. Alexander et al in U.S. Pat. No. 3,158,656 entitled "Organoboron Alcohols and their Preparation," disclose methods of preparing this alcohol, herein incorporated by reference. The patent also discloses the 3 dimensional structure of the dicarbadodecaborane alcohol. In this specification the shortened formulas $B_{10}H_{10}[C(CH_2CH_2OH)]_2$ or

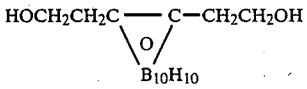

will be used to designate 1,2-bis(2-hydroxyethyl)-1,2dicarbadodecaborane(12).

The dihydroxy-terminated fluorodiols which may be used in the diol comonomer mixture include (1) 2,2,3,3,4,4-hexafluoropentane-1,5-diol, $HOCH_2CF_2CF_2CF_2CH_2OH$;

(2) 2,2,3,3,4,4,5,5-octafluorohexane-1,6-diol, $HOCH_2CF_2CF_2CF_2CF_2CH_2OH$;

(3) 2,4,4,5,5,6,6-heptafluoro-2-trifluoromethyl-3-oxaheptane-1,7-diol, $HOCH_2CF(CF_3)OCF_2CF_2CF_2CH_2OH$;

(4) 2,2,4,4,5,5,7,7-octafluoro-3,6-dioxaoctane-1,8-diol, $HOCH_2CF_2OCF_2CF_2OCF_2CH_2OH$;

(5) 3,3,4,4-tetrafluorohexane-1,6-diol, $HOCH_2CH_2(CF_2)_2CH_2CH_2OH$;

(6) 3,3,4,4,5,5,6,6-octafluorooctane-1,8-diol, $HOCH_2CH_2(CF_2)_4CH_2CH_2OH$;

(7) 3,3,4,4,5,5,6,6,7,7,8,8-dodecafluorodecane-1,10-diol, $HOCH_2CH_2(CF_2)_6CH_2CH_2OH$;

(8) 3,3,4,4,5,5,6,6,7,7,8,8,9,9,10, 10-hexadecafluorododecane-1,12-diol, $HOCH_2CH_2(CF_2)_8CH_2CH_2OH$;

(9) 3,3,4,4,5,5,6,6,7,7,8,8,9,9,10,10,11,11,12,12-eicosafluorotetradecane-1,14-diol, $HOCH_2CH_2(CF_2)_{10}CH_2CH_2OH$;

or mixtures thereof.

1,2-bis(2-hydroxyethyl)-1,2-dicarbadodecaborane(12) comprises from more than zero to less than 50, preferably from more than zero to 30, more preferably from 1 to 20, and still more preferably from 5 to 10 mole percent of the diol comonomer mixture, with the fluorodiol comprising the remainder. Again, the monomeric units produced from these diols will be randomly distributed in the copolyformal chain with formal (—$OCH_2O$—) links between diol monomeric units. The copolyformal is treated to convert terminal hemiformal (—$CH_2OCH_2OH$) groups into terminal hydroxy groups —$CH_2OH$. For example this can be done with $H_2O_2$ as illustrated in the examples. This treatment improves the stability of the end groups and the stability of the polymers.

The copolyformals of this invention can be modified by replacing from more than zero to less than 50, and preferably from 10 to 30 percent of the fluorodiol with an equal number of moles of a nitrodiol which is:

(1) 3-nitro-3-azapentane-1,5-diol, $HOCH_2CH_2N(NO_2)CH_2CH_2OH$;

(2) 3,5,5-trinitro-3-azaheptane-1,7-diol, $HOCH_2CH_2N(NO_2)CH_2C(NO_2)_2CH_2CH_2OH$;

(3) 3,6-dinitro-3,6-diazaoctane-1,8-diol, $HOCH_2CH_2N(NO_2)CH_2CH_2N(NO_2)CH_2CH_2OH$;

(4) 2,2,8,8-tetranitro-4,6-dioxanonane-1,9-diol, $HOCH_2C(NO_2)_2CH_2OCH_2OCH_2C(NO_2)_2CH_2OH$;

(5) 3,5,5,7-tetranitro-3,7-diazanonane-1,9-diol, $HOCH_2CH_2N(NO_2)CH_2C(NO_2)_2CH_2N(NO_2)CH_2CH_2OH$;

(6) 3,3,5,7,7-pentanitro-5-azanonane-1,9-diol, $HOCH_2CH_2C(NO_2)_2CH_2N(NO_2)CH_2C(NO_2)_2CH_2CH_2OH$;

(7) 4,4,10,10-tetranitro-6,8-dioxatridecane-1,13-diol, $HOCH_2CH_2CH_2C(NO_2)_2CH_2OCH_2OCH2C(NO_2)_2CH_2CH_2CH_2OH$;

(8) 3,5,5,11,11,13-hexanitro-3,13-diaza-7,9-dioxapentadecane-1,15-diol, $HOCH_2CH_2N(NO_2)CH_2C(NO_2)_2CH_2OCH_2OCH_2C(NO_2)_2CH_2N(NO_2)CH_2CH_2OH$: or mixtures thereof. Preferred among these nitrodiols are $HOCH_2CH_2N(NO_2)CH_2CH_2N(NO_2)CH_2CH_2OH$, $HOCH_2CH_2N(NO_2)CH_2C(NO_2)_2CH_2N(NO_2)CH_2CH_2OH$, $HOCH_2C(NO_2)_2CH_2OCH_2OCH_2C(NO_2)_2CH_2OH$, or $HOCH_2CH_2N(NO_2)CH_2C(NO_2)_2CH_2OCH_2OCH_2C(NO_2)_2CH_2N(NO_2)CH_2CH_2OH$;

Examples 1 through 3 illustrate the conditions for preparing the copolyformals of this invention. The polycondensation of mixtures of the 1,2-bis(2-hydroxyethyl)-1,2dicarbadodecaborane(12) and fluorodiol with formaldehyde is accomplished at room temperature in sulfolane with a boron trifluoride etherate catalyst. The boron trifluoride etherate is added slowly to a mixture of the fluorodiol, formaldehyde, and sulfolane to prevent overheating. After completion of the reaction, the copolyformal is isolated as described in the examples. The same procedure is used when a minor fraction of the fluorodiol is replace with a nitrodiol as discussed above.

The copolyformals of this invention preferably have a number average molecular weight of from about 1000 to about 4000 and more preferably from 2000 to 3000. The average molecular weight may be adjusted by varying the stoichiometry (ratio of formaldehyde to diols) and reaction conditions (amount of $BF_3$ etherate and solvent, temperature).

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Poly (2,2,3,3,4,4,5,5,-octafluorohexane-1,6,-diol formal-co-1,2-bis (2-hydroxyethyl)-1,2-dicarbadodecaborane (12) formal)

Under a nitrogen blanket, 1.388 g (5.3 mmol) of 2,2,3,3,4,4,5,5-octafluorohexane-1,6-diol and 0.140 g(0.6 mmol) of 1,2-bis(2-hydroxyethyl)-1,2-dicarbadodecaborane(12) were dissolved in 1.5 mL of dry (4A molecular sieves) sulfolane with slight warming. After cooling to room temperature, 0.201 g of trioxane (formaldehyde) was added followed by dropwise addition of 0.6 mL of $BF_3$ etherate. The mixture was stirred 15 hours at 20° C., diluted with 15 mL of dichloromethane and triturated with 20 mL of water and 0.75 ml of 30% aqueous $H_2O_2$ for 3 hours. The organic phase was stirred with 20 mL 1% aqueous KOH+0.4 mL 30% $H_2O_2$ for 3 hours, washed with 15 mL of brine, and freed from solvent in vacuo (60° C.). The resulting resin was triturated with 30 mL portions of water at 40° C. until no sulfolane could be detected by NMR (proton spectrum, Varian 390 90 MHz instrument). The polymer was finally redissolved in dichloromethane, the solution stirred with a small amount of silica gel (Kieselgel 60) overnight, filtered, and evaporated. Obtained was 1.2 g of a colorless resin (75% yield). The polymer had $\overline{M}_N=2074$, $\overline{M}_W=3642$.

EXAMPLE 2

The procedure of example 1 was repeated using a 80:20 molar ratio of 2,2,3,3,4,4,5,5-octafluorohexane-1,6-diol to 1,2-bis(2-hydroxyethyl)-1,2-dicarbadodecaborane(12). The yield was 75%, the $\overline{M}_N$ was 1702, and the glass transition temperature ($T_G$) was −44.7° C.

EXAMPLE 3

The procedure of example 1 was repeated using a 65:35 molar ratio of 2,2,3,3,4,4,5,5-octafluorohexane-1,6-diol to 1,2-bis(2-hydroxyethyl)-1,2-dicarbadodecaborane. The yield was 75% and the $\overline{M}_N=1885$.

Obviously, numerous modifications and variations of the present invention are possible in light of the above teachings. It is therefore to be understood that within the scope of the appended claims the invention may be practiced otherwise than as specifically described herein.

We claim:

1. A dihydroxy-terminated copolyformal formed from

A. formaldehyde and

B. a diol comonomer mixture of (1) 1,2-bis(2-hydroxyethyl)-1,2-dicarbadodecaborane(12) and (2) a fluorodiol selected from the group consisting of $HOCH_2CF_2CF_2CF_2CH_2OH$, $HOCH_2CF_2CF_2CF_2CF_2CH_2OH$, $HOCH_2CF(CF_3)OCF_2CF_2CF_2CH_2OH$, $HOCH_2CF_2OCF_2CF_2OCF_2CH_2OH$, $HOCH_2CH_2(CF_2)_2CH_2CH_2OH$, $HOCH_2CH_2(CF_2)_4CH_2CH_2OH$, $HOCH_2CH_2(CF_2)_6CH_2CH_2OH$, $HOCH_2CH_2(CF_2)_8CH_2CH_2OH$, $HOCH_2CH_2(CF_2)_{10}CH_2CH_2OH$, and mixtures thereof, wherein 1,2-bis(2-hydroxyethyl)-1,2-dicarbadodecaborane(12) comprises from more than zero to less than 50 mole percent of the diol comonomer mixture with the fluorodiol being the remainder, and wherein the terminal functional groups of the copolyformal are hydroxy groups.

2. The copolyformal of claim 1 wherein 1,2-bis(2-hydroxyethyl)-1,2-dicarbadodecaborane(12) comprises from more than zero to 30 mole percent of the diol comonomer mixture with the fluorodiol being the remainder.

3. The copolyformal of claim 2 wherein 1,2-bis(2-hydroxyethyl)-1,2-dicarbadodecaborane(12) comprises from more than zero to 20 mole percent of the diol comonomer mixture with the fluorodiol being the remainder.

4. The copolyformal of claim 3 wherein 1,2-bis(2-hydroxyethyl)-1,2-dicarbadodecaborane(12) comprises from more than zero to 10 mole percent of the diol comonomer mixture with the fluorodiol being the remainder.

5. The copolyformal of claim 1 wherein the flurodiol is $HOCH_2CF_2CF_2CF_2CH_2OH$.

6. The copolyformal of claim 1 wherein the fluorodiol is $HOCH_2CF_2CF_2CF_2CF_2CH_2OH$.

7. The copolyformal of claim 1 wherein the fluorodiol is $HOCH_2CF(CF_3)OCF_2CF_2CF_2CH_2OH$.

8. The copolyformal of claim 1 wherein the number average molecular weight of the copolyformal is from about 1000 to about 4000.

9. The copolyformal of claim wherein the number average molecular weight of the copolyformal is from 2000 to 3000.

10. A dihydroxy-terminated copolyformal formed from

A. formaldehyde and

B. a diol comonomer mixture wherein (1) from more than zero to less than 50 mole percent of the diol comonomer mixture is 1,2-bis(2-hydroxyethyl)-1,2-dicarbadodecaborane(12), and (2) the remainder of the diol comonomer mixture is a fluorodiol/nitrodiol mixture of (a) a fluorodiol which is $HOCH_2CF_2CF_2CF_2CH_2OH$, $HOCH_2CF_2CF_2CF_2CF_2CH_2OH$, $HOCH_2CF(CF_3)OCF_2CF_2CF_2CH_2OH$, $HOCH_2CF_2OCF_2CF_2OCF_2CH_2OH$, $HOCH_2CH_2(CF_2)_2CH_2CH_2OH$, $HOCH_2CH_2(CF_2)_4CH_2CH_2OH$, $HOCH_2CH_2(CF_2)_6CH_2CH_2OH$, $HOCH_2CH_2(CF_2)_8CH_2CH_2OH$, $HOCH_2CH_2(CF_2)_{10}CH_2CH_2OH$, or mixtures thereof, and (b) a nitrodiol which is $HOCH_2CH_2N(NO_2)CH_2CH_2OH$, $HOCH_2CH_2N(NO_2)CH_2C(NO_2)_2CH_2CH_2OH$, $HOCH_2CH_2N(NO_2)CH_2CH_2N(NO_2)CH_2CH_2OH$, $HOCH_2C(NO_2)_2CH_2OCH_2OCH_2C(NO_2)_2CH_2OH$, $HOCH_2CH_2N(NO_2)CH_2C(NO_2)_2CH_2N(NO_2)CH_2CH_2OH$, $HOCH_2CH_2C(NO_2)_2CH_2N(NO_2)CH_2C(NO_2)_2CH_2CH_2OH$, $HOCH_2CH_2CH_2C(NO_2)_2CH_2OCH_2OCH_2C(NO_2)_2CH_2CH_2CH_2OH$, $HOCH_2CH_2N(NO_2)CH_2C(NO_2)_2CH_2OCH_2OCH_2C(NO_2)_2CH_2N(NO_2)CH_2CH_2OH$, or mixtures thereof, wherein the nitrodiol comprises from more than zero to less than 50 mole percent of the fluorodiol/nitrodiol mixture with the fluorodiol comprising the remainder.

11. The copolyformal of claim 10 wherein the nitrodiol comprises from 10 to 30 mole percent of the fluorodiol/nitrodiol mixture.

12. The copolyformal of claim 10 wherein the nitrodiol is $HOCH_2CH_2N(NO_2)CH_2CH_2N(NO_2)CH_2CH_2OH$, $HOCH_2CH_2N(NO_2)CH_2C(NO_2)_2CH_2N(NO_2)CH_2CH_2OH$, $HOCH_2C(NO_2)_2CH_2OCH_2OCH_2C(NO_2)_2CHhd$ 2OH, or $HOCH_2CH_2N(N_2)CH_2C(NO_2)_2CH_2OCH_2OCH_2C(NO_2)_2CH_2N(NO_2)CH_2CH_2OH$.

13. The copolyformal of claim 10 wherein the nitrodiol is $HOCH_2CH_2N(NO_2)CH_2CH_2N(NO_2)CH_2CH_2OH$.

14. The copolyformal of claim 10 wherein the nitrodiol is $HOCH_2CH_2N(NO_2)CH_2C(NO_2)_2CH_2N(NO_2)CH_2CH_2OH$.

15. The copolyformal of claim 10 wherein the nitrodiol is $HOCH_2C(NO_2)_2CH_2OCH_2OCH_2C(NO_2)_2CH_2OH$.

16. The copolyformal of claim 12 wherein the nitrodiol is $HOCH_2CH_2N(NO_2)CH_2C(NO_2)_2CH_2OCH_2OCH_2C(NO_2)_2CH_2N(NO_2)CH_2CH_2OH$.

* * * * *